United States Patent
McNeill

(10) Patent No.: US 8,254,561 B1
(45) Date of Patent: Aug. 28, 2012

(54) HEADSET ADAPTER WITH HOST PHONE DETECTION AND CHARACTERIZATION

(75) Inventor: Iain McNeill, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1533 days.

(21) Appl. No.: 11/787,577

(22) Filed: Apr. 17, 2007

(51) Int. Cl.
*H04M 9/08* (2006.01)

(52) U.S. Cl. .................................... 379/406.1

(58) Field of Classification Search ............... 379/406.1
See application file for complete search history.

(56) References Cited

U.S. PATENT DOCUMENTS

| | | | |
|---|---|---|---|
| 6,694,017 B1* | 2/2004 | Takada | 379/402 |
| 2002/0071547 A1* | 6/2002 | Bershad et al. | 379/406.01 |
| 2003/0021408 A1* | 1/2003 | Mauney et al. | 379/390.01 |
| 2006/0251243 A1* | 11/2006 | Tanrikulu et al. | 379/406.08 |
| 2008/0198779 A1* | 8/2008 | Jaermyr et al. | 370/290 |
| 2008/0201138 A1* | 8/2008 | Visser et al. | 704/227 |

* cited by examiner

*Primary Examiner* — Alexander Jamal
(74) *Attorney, Agent, or Firm* — Chuang Intellectual Property Law

(57) ABSTRACT

Systems and methods for a headset adapter circuit are disclosed. The headset adapter circuit generally includes a maximal length sequence generator circuit coupled to the adapter transmit signal line for injecting a maximal length sequence signal. A maximal length sequence cross-correlator circuit is coupled to the adapter receive signal line for capturing a receive signal sample and convolving the receive signal sample with the maximal length sequence signal to generate a host phone sidetone path impulse response.

24 Claims, 8 Drawing Sheets

HEADSET ADAPTER WITH HOST PHONE DETECTION AND CHARACTERIZATION

BACKGROUND OF THE INVENTION

A significant problem with telephone headset adapters is that they have to be configured to match the host phone to which they will be attached. This configuration involves making sure that the cable wiring of the adapter matches that of the host phone handset jack, ensuring an appropriate transmit signal gain applied to a transmit signal received from a headset microphone, and ensuring an appropriate receive signal gain applied to a receive signal to be output at a headset speaker. Certain settings may be required to obtain the best signal quality and meet network regulatory requirements.

The electrical connection to the host phone handset jack typically includes four wires, two of which are connected to a receive circuit and two of which are connected to a transmit circuit. In order for the headset adapter to process and transfer the transmit signal received from a headset microphone, the headset adapter transmit lines must be matched with the two wires of the host phone handset jack corresponding to the host phone transmit circuit. Similarly, in order for the headset adapter to receive and process a receive signal transferred from the host phone, the headset adapter receive lines must be matched with the two wires of the host phone handset jack corresponding to the host phone receive circuit.

In addition, different host phones may utilize transmit circuits of varying sensitivities. The headset adapter must provide a transmit signal gain adjustment to prevent the output from the headset adapter being too low or too high on the microphone transmit lines. Similarly, different host phones may utilize receive circuits which output a receive signal at varying gain levels. The headset adapter must provide a receive signal gain adjustment to prevent overloading of the headset adapter receive circuit or outputting a receive signal to the headset speaker at too high of a volume for the user.

However, because the handset jack wiring, host phone transmit circuit sensitivity, or host phone receive circuit output is not known in advance by the headset adapter manufacturer, various wiring configuration settings, transmit signal gain settings, and receive signal gain settings need to be provided on the headset adapter unit. In the prior art, these settings have been performed manually by the user. For example, the user must test different wiring configurations to match the transmit lines and receive lines of the headset adapter with the corresponding lines of the host phone handset jack. Once the wiring is correctly set, the user must make a test call and adjust the transmit sensitivity until the far end caller can hear properly. The user must also adjust the receive sensitivity so that the output at the headset speaker is at a comfortable level. This requires the user to perform a set up sequence whereby they try different settings, make test calls and subjectively judge when a configuration is optimally set.

Furthermore, with the introduction of digital signal processing and the inherent latency associated with such technology, additional problems with delayed sidetone have required the use of echo cancellers to remove the sidetone generated in the host phone. The rules governing the convergence of the adaptive filters in such echo cancellers can prevent the convergence if the configuration gains are not accurately set. This is because the sidetone level must be significantly less than the incoming receive signal level for the double-talk detector to allow the echo canceller to converge. If the host phone has high sidetone, or if the user has set the transmit gain too high, the echo canceller will not work.

In the prior art, there have been attempts at auto configuration of headset adapters which have involved passing tones through the host phone sidetone path and attempting to recognize and measure the level of the returning signal. The controller would then cycle through the switch options, take measurements on each and try to judge the best setting. Frequently, multiple settings would give erroneous signal levels due to hum and buzz or cross-coupled circuits and the controller would pick the wrong setting, forcing the user to manually set up the adapter. These techniques require the user to physically put the unit into a "learn mode" which is not intuitive and may be inadvertently omitted by the user if instructions accompanying the headset are not read. U.S. Pat. No. 5,729,603 titled "Self-Configuring Telephone Interface Unit" and also assigned to the present applicant Plantronics, Inc., discloses the use of a test dial tone in the auto configuration process.

Another prior art method used a measurement of the host phone microphone bias voltage and current to determine what kind of microphone was being used in the handset and set the gains accordingly. This solution is only partially successful as the range of microphone sensitivities for a particular type was too great and the gain still required user intervention in order to optimize.

While these solutions work to varying extents, they may be difficult for a user to operate. This introduces complexity for the user in setting the unit up to work properly with their phone. As a result, for these and other reasons, there is a need for improved methods and apparatuses for headset adapter circuits.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
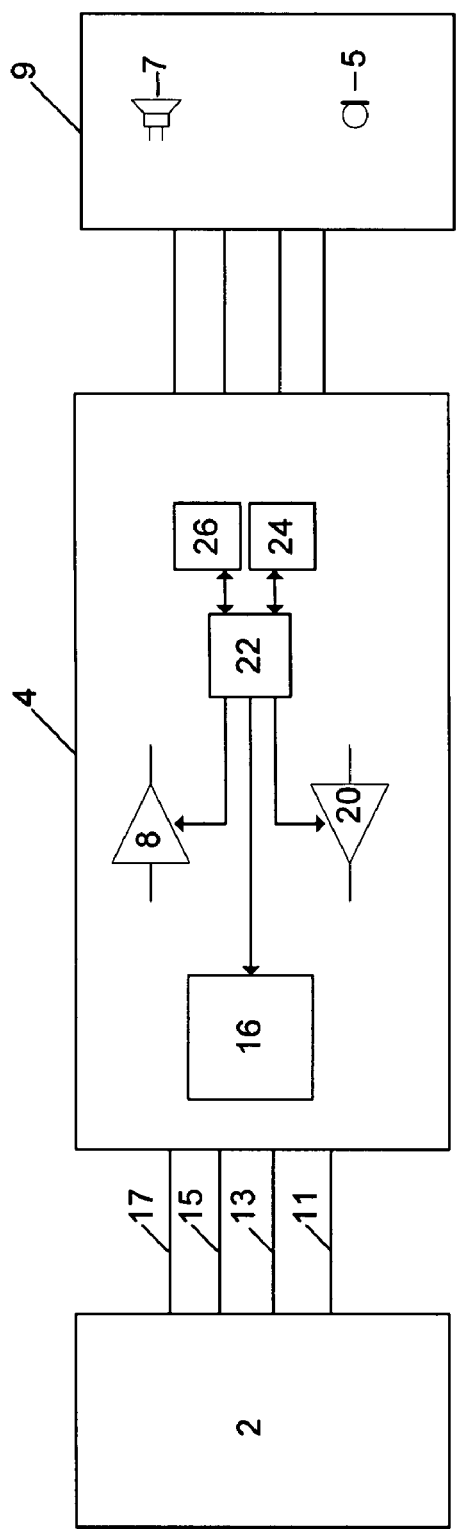
FIG. 1 is a general block diagram of a headset adapter in one example of the invention in use with a telephone and headset.

Methods and apparatuses for headset adapter circuits are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Generally, this description describes a method and apparatus for a headset adapter with host phone detection and characterization. In one example, the methods and systems described are used to automate installation of a headset adapter and prevent incorrect headset adapter settings. Comfort noise is used in many digital communications devices to reassure the user that the system is active and to mask low level artifacts in the signal processing and signal conversion circuits. The methods and systems described advantageously use comfort noise to automate the headset adapter installation process.

In particular, instead of using a random noise for this comfort noise, a pseudo-random noise, specifically a maximum length sequence (MLS) noise is used. This signal whilst appearing to be random is actually repetitive and has the advantage that it can be accurately correlated with the original signal. Through the use of a Hadamard transform, the signal can be convolved directly into the impulse response of the processing channel. Yet another advantage of the MLS technique is that it is very immune to any other system noise and can be correlated at very low signal to noise ratios. The comfort noise is injected at the network noise floor level so that it is just perceivable by the user and far end listener at the appropriate comfort noise levels. In a further example, pseudo-random noise other than an MLS signal may be used. However, the use of an MLS signal advantageously provides direct system identification and allows for correlation where the injected signal level is at or below the noise floor.

By injecting a very low level MLS signal into the transmit channel at all times and continually or periodically performing the Hadamard convolution on the incoming receive signal the headset adapter can:

(1) detect the host phone hookswitch state. For example, when the headset adapter detects that the host phone is off-hook, power intensive features such as wireless links and advanced DSP signal processing are activated from an on-hook sleep mode;

(2) configure the headset adapter wiring to match the transmit lines and the receive lines with the host phone handset jack wiring;

(3) determine the sidetone gain/loss, i.e. a first approximation to the correct Rx and Tx gain. Knowing the sidetone characteristics and the requirements for the desired Sidetone Masking Ratio (STMR), a measure of the appropriate TX and Rx gain settings can be made and programmed into the headset adapter.

(4) Measure the impulse response of the host phone sidetone path. In products featuring a sidetone canceller, the MLS signal will give a very accurate measurement of the sidetone path and provide adaptive filter coefficients directly in the form used by the filter. The adaptive filter will be immediately initialized to a highly adapted state.

The described methods and system provide a headset adapter unit that is significantly easier to set up and operate. While the present invention is not necessarily limited to headset adapters, various aspects of the invention may be appreciated through a discussion of various examples using this context.

In one example, a headset adapter circuit includes a controller, an adjustable gain receive signal amplifier on an adapter receive signal line, and an adjustable gain transmit signal amplifier on an adapter transmit signal line. A configurable switch matrix is connected to the adapter receive signal line, the adapter transmit signal line, a host phone transmit signal line and a host phone receive signal line. A maximal length sequence generator circuit is coupled to the adapter transmit signal line for injecting a maximal length sequence signal into the adapter transmit signal line. A maximal length sequence cross-correlator circuit is coupled to the adapter receive signal line for capturing a receive signal sample from the adapter receive signal line and convolving the receive signal sample with the maximal length sequence signal to generate a host phone sidetone path impulse response. An adjustable gain transmit signal amplifier gain and a configurable switch matrix switch setting are modifiable responsive to the host phone sidetone path impulse response.

In one example, a method for configuring a headset adapter includes injecting a test maximal length sequence signal into an adapter transmit signal line and taking a receive signal sample from an adapter receive signal line. The method includes convolving the test maximal length sequence signal with the receive signal sample to generate a host phone sidetone path impulse response and cycling through a plurality of configuration settings on a switch matrix until a host phone sidetone path impulse response maximum is above a pre-determined threshold level. The switch matrix is connected to the adapter receive signal line, the adapter transmit signal line, a host phone transmit signal line and a host phone receive signal line. The method further includes calculating a sidetone masking ratio and adjusting a transmit amplifier gain to achieve a desired sidetone mask ratio.

In one example, a headset adapter circuit includes a controller, an adapter receive signal line for coupling to a host phone, an adapter transmit signal line for coupling to a host phone, and a maximal length sequence generator coupled to the adapter transmit signal line for injecting a maximal length sequence signal into the adapter transmit signal line. The headset adapter circuit further includes a maximal length sequence cross-correlator coupled to the adapter receive signal line for capturing a receive signal sample from the adapter receive signal line and convolving the receive signal sample with the maximal length sequence signal to generate a host phone sidetone path impulse response used to measure one or more electro-acoustic properties of the host device. Electro-acoustic properties may include for example, without limitation, impedance measurements, linearity measurements, sidetone gain measurements, and host phone on hook or off hook determinations.

In one example, a method for measuring an electro-acoustic property of a host phone with a headset adapter includes injecting a test maximal length sequence signal into a headset adapter transmit signal line, taking a receive signal sample from a headset adapter receive signal line, and convolving the test maximal length sequence signal with the receive signal sample to generate a host phone sidetone path impulse response.

FIG. 1 is a general block diagram of a headset adapter 4 in use with a telephone host phone base 2 and a headset 9. Headset 9 includes a microphone 5 and speaker 7. Two signal lines from signal lines 11, 13, 15, and 17 are used as microphone transmit lines for a transmit audio signal corresponding to audio received at microphone 5 located at headset 9.

The remaining two signal lines from signal lines 11, 13, 15, and 17 are used as receive lines to transmit a receive audio signal received at host phone base 2 from a telecommunications network to speaker 7 at headset 9 for output to a headset user. Typically, signal lines 11, 13, 15, and 17 are contained within a cord with a first end coupled to the host phone base 2 and a second end coupled to the headset adapter 4.

Headset adapter 4 includes a receive amplifier 8 for amplifying the receive signal on the receive lines from host phone base 2. Headset adapter 4 includes a transmit amplifier 20 for amplifying the transmit signal on the transmit lines to host phone base 2. A host wiring configuration switch 16 is used to selectively couple two of signal lines 11, 13, 15, and 17 to receive amplifier 8 and to selectively couple two of signal lines 11, 13, 15, and 17 to transmit amplifier 20. Host wiring configuration switch matrix settings are automatically controlled by a detection logic and system configuration controller 22. Detection logic and system configuration controller 22 also automatically controls the gain of transmit amplifier 20 and the gain of receive amplifier 8. Detection logic and system configurator utilizes a MLS generator 24 and MLS cross-correlator 26 to automatically detect the appropriate settings for host wiring configuration switch 16 to identify from signal lines 11, 13, 15, and 17 the correct transmit lines and the correct receive lines. Detection logic and system configurator utilizes MLS generator 24 and MLS cross-correlator 26 to automatically determine the gain setting for transmit amplifier 20 and the gain setting for receive amplifier 8.

One advantage of the present headset adapter 4 is that the user need not determine the correct configuration of the signal lines 11, 13, 15, and 17 when the headset adapter is attached to the host phone base 2 to match the transmit and receive lines. The headset adapter 4 allows for automatic configuration of the host wiring configuration switch 16 to match the transmit lines and receive lines. Furthermore, the present headset adapter 4 automatically sets the gain of transmit amplifier 20 to achieve a desired transmit level in conjunction with the host phone base and the gain of receive amplifier 8 to prevent clipping of the headset amplifier receive circuit.

Figure 2:
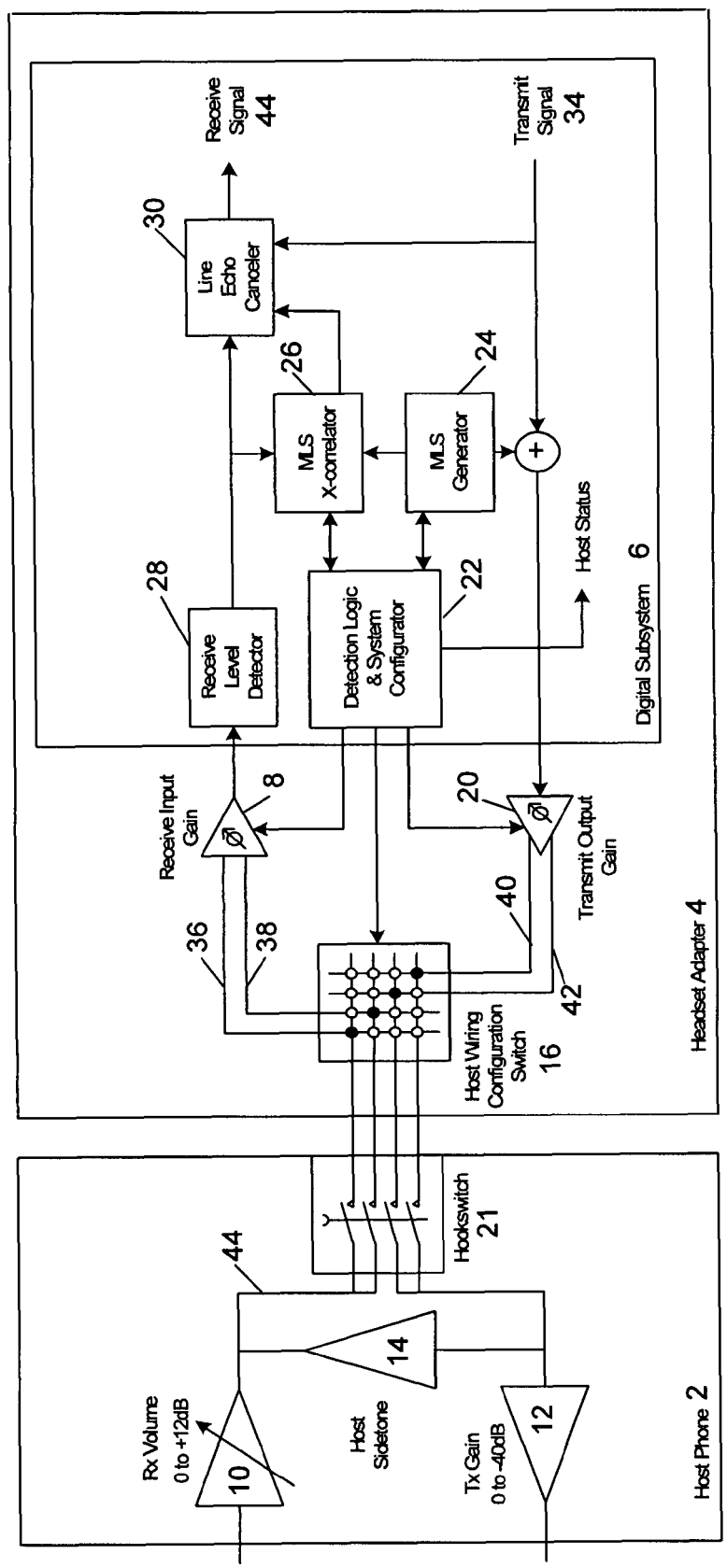
FIG. 2 is top level block diagram for the headset adapter in one example of the invention.

FIG. 2 is top level block diagram for a headset adapter 4 in one example implementation of the invention. The headset adapter 4 is shown attached to a telephone host phone base 2. Headset adapter 4 includes a host wiring configuration switch 16, receive amplifier 8, and transmit amplifier 20. Headset adapter 4 includes a digital subsystem 6 for configuring and controlling settings for headset adapter 4. Digital subsystem 6 includes a detection logic and system configuration controller 22, MLS cross-correlator 26, MLS generator 24, receive level detector 28, and line echo canceller (LEC) 30. Detection logic and system configuration controller 22 interfaces with MLS cross-correlator 26 and MLS generator 24. Receive level detector 28 is coupled to the output of receive amplifier 8 and outputs a receive signal 44 to line echo canceller 30 and a level signal to the detection logic and system configuration controller. Line echo canceller 30 outputs the receive signal 44 to a headset speaker (not shown). Line echo canceller also receives a transmit signal 34. Transmit signal 34 is received from a headset microphone (not shown) and provided to transmit amplifier 20. The MLS generator 24 injects an MLS signal to the transmit signal 34.

Host wiring configuration switch 16 is switched to route receive signal 44 from host phone base 2 to receive signal lines 36, 38 input to receive amplifier 8. Host wiring configuration switch 16 is switched to route transmit signal 34 on transmit signal lines 40, 42 from transmit amplifier 20 to the host phone transmit circuit. In one example, host wiring configuration switch 16 is a 4×4 switch matrix.

Host phone base 2 includes a Rx signal volume control 10 for adjusting the gain of a receive signal from a far end user, a Tx signal amplifier 12 for amplifying a transmit signal, a host sidetone amplifier 14 for inserting a sidetone signal into the receive signal, and hookswitch 21.

Detection logic and system configuration controller 22 adjusts the settings of host wiring configuration switch 16 so that the receive signal lines 36 and transmit signal lines 40, 42 are correctly coupled to the transmit and receive signal lines of host phone base 2. In one example, when the headset adapter 4 is powered on for the first time, it enters a configuration mode. In this mode, an outgoing MLS signal is injected into the transmit channel at a nominal level and the return signal via the host phone sidetone path is monitored at the receive input. Crosspoint switches on the host wiring configuration switch 16 are actuated to run through a sequence of wiring combinations and a correlation of the outgoing MLS signal with the incoming receive signal 44 performed. An example sequence of wiring combinations is shown below:

| Sequence | Pin 1 | Pin 2 | Pin 3 | Pin 4 |
|---|---|---|---|---|
| 1 | Rx+ | Rx− | Tx+ | Tx− |
| 2 | Tx+ | Tx− | Rx+ | Rx− |
| 3 | Rx+ | Tx+ | Rx− | Tx− |
| 4 | Tx+ | Rx+ | Tx− | Rx− |
| 5 | Rx+ | Tx+ | Tx− | Rx− |
| 6 | Tx+ | Rx+ | Rx− | Tx+ | where Rx+/− are the two signal lines 36, 38 to the handset speaker and Tx+/− are the two signal lines 40, 42 to the handset microphone.

The MLS signal injected into the transmit channel is generated by MLS generator 24. In one example, the MLS signal is generated by the use of a shift register with feedback where the input is fed from the modulo-2 sum of a combination of the stage outputs. The shift register will sequence through a number of states before repeating. The length of this unique sequence is given by the number of stages in the shift register:

$$L = 2^n - 1$$

where L is the length of the sequence and n is the number of stages.

The cross-correlation of the MLS signal can be efficiently performed by means of a circular convolution given by:

$$C(i) = \sum_{j=1}^{n} M(j) \cdot Rx(i-j)$$

C(i) is the correlation array
M(j) is the MLS sequence injected into the transmit channel output
Rx(i-j) is the sidetone signal at the receive channel input
The resulting correlation array will be small and homogenous for non-correlated signal while strongly correlated signals will yield correlation arrays with large values in a few bins.

A full discussion of the mathematics behind the MLS theory is provided in "An Efficient Algorithm for Measuring the Impulse Response Using Pseudorandom Noise" by Jeffrey Borish and James Angell, J. Audio Eng. Soc. Vol. 31, No. 7, July/August 1983, which is hereby incorporated by reference.

When using an MLS signal as comfort noise, a high order sequence is required to ensure the signal sounds white. In one example, an order of greater than or equal to 13 is used so that the MLS signal does not have a tonal nature due to a relatively short repetition rate, which would make it inappropriate as a masking signal or comfort noise. The configuration mode algorithm continues cycling through the wiring combinations testing for correlation at each setting until a positive identification is made and the correct wiring configuration is saved to internal, non-volatile memory.

In one example mode of operation, detection logic and system configuration controller 22 adjusts the settings of receive amplifier 8. In one example, if at anytime during the configuration mode, the system detects dial tone, indicating that an outgoing call is to be made, the configuration algorithm will measure the amplitude of this dial tone and then output a DTMF tone burst to break dial tone and allow the MLS comfort noise to be detected. The peak amplitude of this dial tone is a good estimation of the maximum normal receive signal level for that host phone and this value is then used to set the headset adapter receive input gain. This ensures that the receive input amplifier 8 in the headset adapter 4 will not clip the incoming signal and that sufficient signal to noise ratio will be provided to allow high quality communication.

Detection logic and system configuration controller 22 adjusts the settings of transmit amplifier 20. In one example mode of operation, once the wiring and receive input gain has been set, another receive signal sample is taken and this is circularly convolved with the original injected MLS signal. The result of this process is the impulse response of the host phone sidetone path. This impulse response is easily converted to the frequency domain using a fast Fourier transform (FFT) and allows an accurate calibration of the sidetone path spectrum and gain. The transmit output gain is then programmed such that an ideal SideTone Masking Ratio is achieved and this provides a good estimate of the correct transmit level to match the headset adapter 4 with the host phone base 2. The method to determine the ideal Side-Tone Masking Ratio is defined by ITU-T Recommendation P.79.

Figure 3:
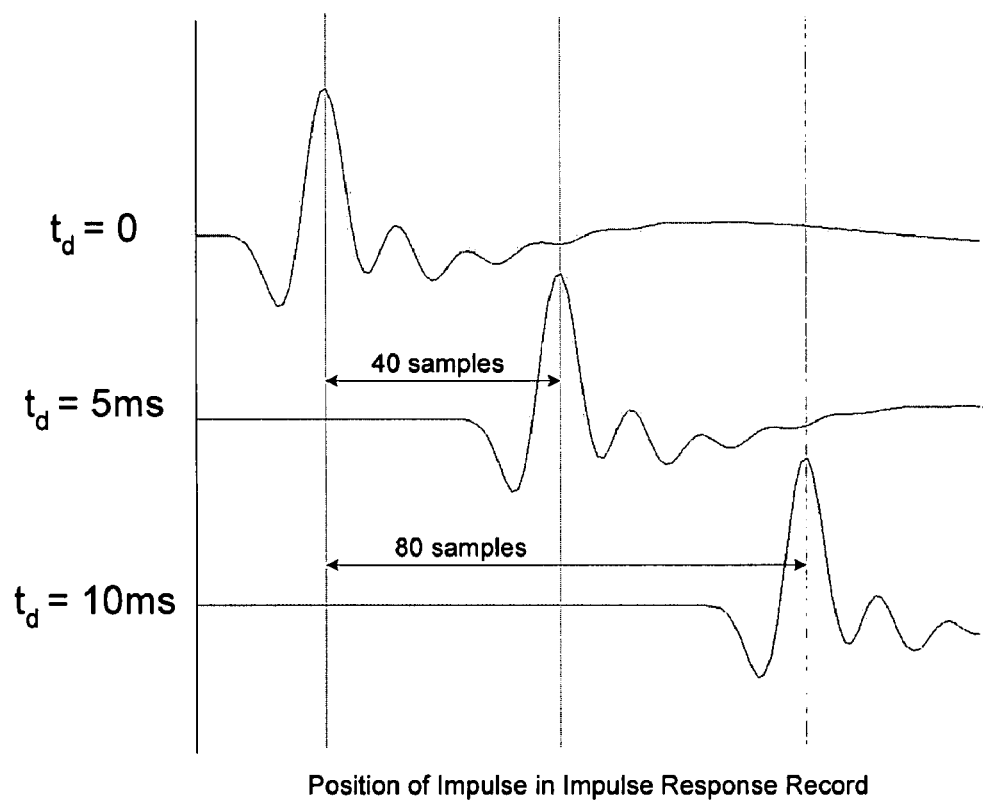
FIG. 3 is a diagram illustrating the position of the impulse in the impulse response record in relation to sidetone path delay

The delay of the sidetone path can be determined directly by locating the peak in the impulse response. Referring to FIG. 3, the position of the impulse in the impulse response record is shown in relation to sidetone path delay. The sidetone path delays are calculated for a sample rate of 8 KS/s. If there is no delay, the impulse will peak early in the record; as the delay increases in units of the sample period, the peak in the impulse will occur at successive samples back in the impulse response record resulting in greater information being lost. In order to achieve the best echo cancellation depth it is useful to add an equivalent delay to the transmit signal input to the echo canceller and bring the impulse forward to the beginning of the record. This allows the full tail length of the adaptive filter to be used for sidetone signal prediction.

In one example, as a final step, the impulse response obtained is used as a starting set of coefficients for the Line Echo Canceller (LEC) 30 to improve initial convergence time and enhance the first impression of the user.

Figure 4:
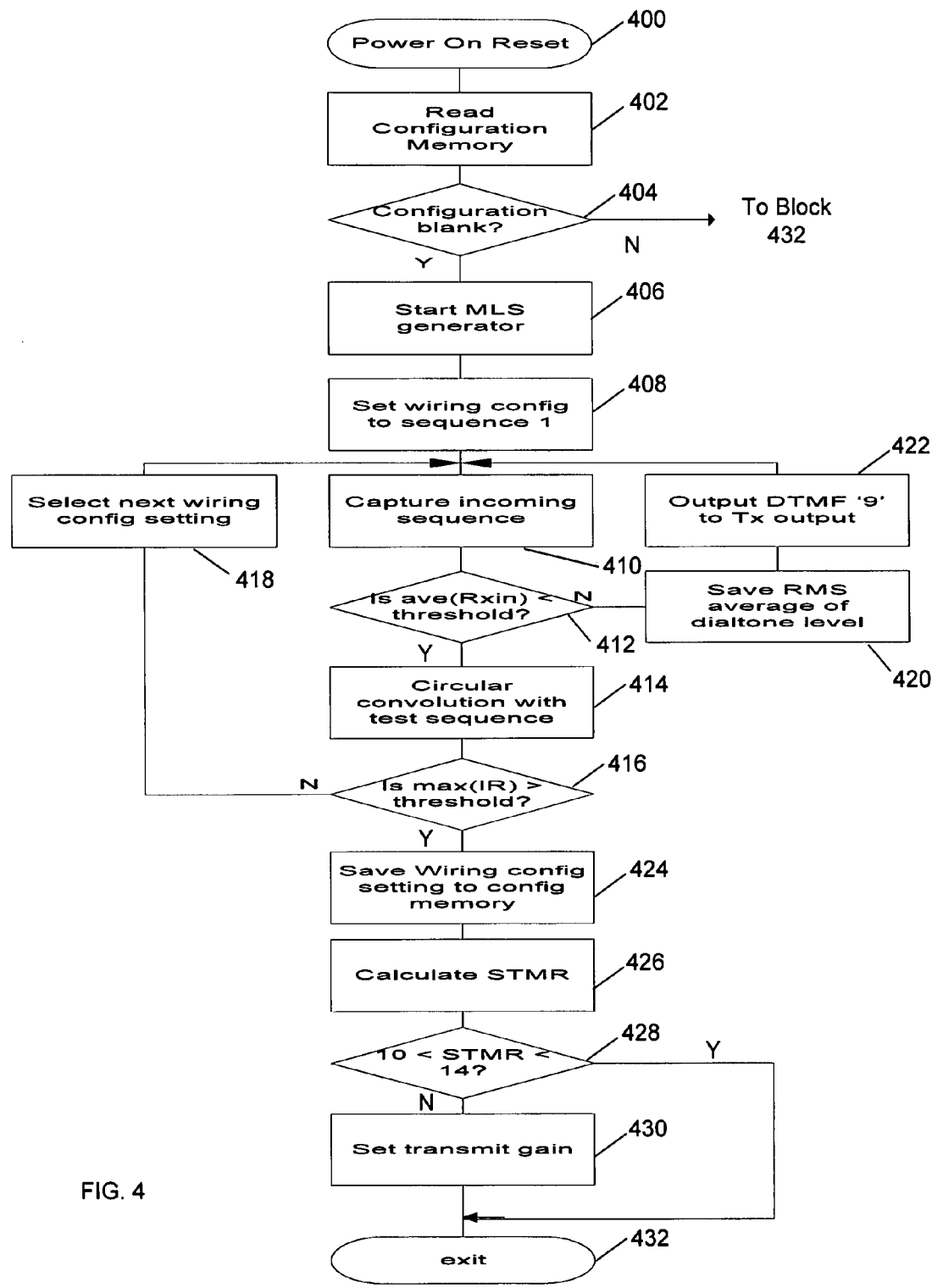
FIG. 4 is a flowchart illustrating an initialization operation of headset adapter in one example of the invention is shown

Referring to FIG. 4, a flowchart illustrating an initialization operation of headset adapter 4 in one example of the invention is shown. At block 400, a power on reset occurs in the digital subsystem 6 of headset adapter 4. At block 402, a configuration memory at headset adapter 4 is read. At decision block 404, if the configuration memory is blank, then in block 406, the MLS generator is started and a MLS signal is injected into the transmit signal. If no at decision block 404, then the process exits at block 432. At block 408, the detection logic and system configuration controller 22 sets host wiring configuration switch 16 to a first configuration setting. At block 410, the MLS cross-correlator 26 captures the incoming sequence on the receive line. At decision block 412, detection logic and system configuration controller 22 determines whether the receive signal (Rxin) level is below a predetermined threshold. If the result of decision block 412 is no, then this corresponds to a dial tone present. At block 420, the RMS average of the dial tone level is saved. The peak amplitude of the dial tone is used by the detection logic and system configuration controller 22 to set the gain of receive amplifier 8. At block 422, a DTMF is output to the transmit signal output. For example, a DTMF '9' may be output. This will break the dialtone and allow the sidetone path to be characterized by the MLS process. Following block 422, the process returns to block 410.

If yes at block 412, then at block 414, the receive signal sample is circularly convolved with the original MLS signal test sequence. The result of this convolution is the impulse response of the host phone sidetone path. At decision block 416, if the maximum of the impulse response is not above a predetermined threshold level, then at block 418 the detection logic and system configuration controller 22 selects the next wiring configuration setting for host wiring configuration switch 16. Following block 418, the process returns to block 410. If yes at decision block 416, then at block 424 the current switch wiring configuration setting is saved to the configuration memory.

At block 426, the STMR is calculated by the detection logic and system configuration controller 22. At decision block 428, the detection logic and system configuration controller 22 determines whether the calculated STMR is within a predetermined acceptable range. In the example shown in FIG. 4, the desired STMR range is between 10 and 14. If yes at decision block 428, then the process exits at block 432. If no at decision block 428, then at block 430 the detection logic and system configuration controller 22 sets the gain of transmit amplifier 20 so the desired STMR range is achieved. At block 432, the process exits.

Figure 5:
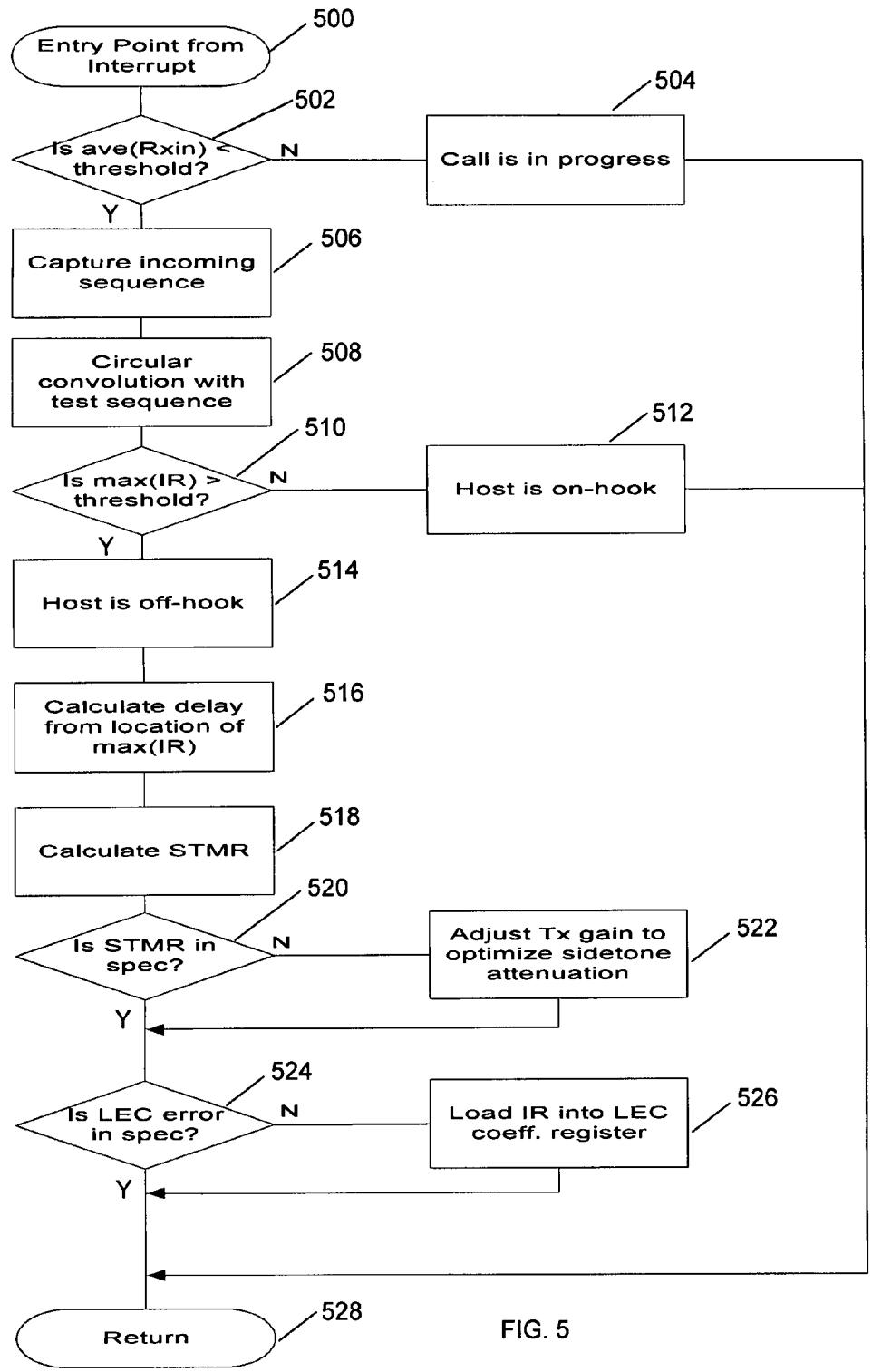
FIG. 5 is a flowchart illustrating monitoring of the state of a host phone hookswitch following the initialization operation of headset adapter

Referring to FIG. 5, a flowchart illustrating monitoring of the state of a host phone hookswitch following the initialization operation of headset adapter 4 shown in FIG. 4. At this point, the host phone has been identified and characterized and the MLS comfort noise is now used to monitor the state of the host phone hookswitch. The MLS generator continuously inputs a low level test MLS signal into the transmit channel to act as comfort noise. Triggered by a system interrupt, the MLS cross-correlator performs a circular convolution of the incoming receive channel signal with the test MLS signal to determine whether the host phone is on or off hook. If the host phone is off hook, there will be high correlation of the incoming receive signal with the test MLS signal. If the phone is on hook, there will be no sidetone present and consequently, there will be low or no correlation. This detection can be used to turn off high power circuits such as radio transmitters and complex processors that would otherwise waste energy in periods of disuse. Similarly, these circuits can be instantly powered up as soon as the adapter re-detects the presence of the MLS comfort noise indicating the host phone is now off hook In one example, at block 500, a system interrupt is generated. At decision block 502, the detection logic and system configuration controller 22 determines whether the receive signal (Rxin) level is below a predetermined threshold. If no at block 502, then this signifies a call is in progress at block 504 and the process skips to return block 528. If yes at block 502, then at block 506, the MLS cross-correlator 26 captures the incoming sequence on the receive line. At block 508, this receive signal sample is circularly convolved with the original test MLS signal sequence. The result of this convolution is the impulse response of the host phone sidetone path.

At decision block 510, the detection logic and system configuration controller 22 determines if the maximum of the impulse response is above a predetermined threshold level. If no at block 510, then at block 512 it is determined that the host phone is on-hook and the process skips to return block 528. If yes at block 510, then at block 514 it is determined that the host is off-hook. At block 516, the sidetone path delay is calculated from the location of the maximum impulse.

At block 518, the STMR is calculated by the detection logic and system configuration controller 22. At decision block 520, the detection logic and system configuration controller 22 determines whether the calculated STMR is within a predetermined specification. If yes at decision block 520, then at decision block 524 it is determined whether the LEC error is within a predetermined specification. If no at decision block 520, then at block 522 the gain of transmit amplifier is adjusted to optimize sidetone attenuation prior to decision block 524. If yes at block 524, then at return block 528 the process returns to the main program. If no at decision block 524, then at block 526, the impulse response is loaded into the LEC coefficient register. At block 528, the process returns to the main program.

In a further example of the invention, the test MLS signal is composed of alternating long MLS sequences with short MLS sequences. For example, a 13$^{th}$ order MLS signal is used for high resolution measurement and comfort noise purposes, but also embedded is a shorter length, lower order MLS sequence at regular intervals, synchronized to the signal capture and convolution process for fast detection and characterization of sidetone path and hookswitch status. In this manner, the delay from initiation of the measurement to completion of the analysis and subsequent system configuration is reduced. The low order MLS sequences only show a tonal nature when they are repeated successively. By its pseudorandom nature, a single low order MLS sequence embedded in a higher order sequence still sounds white.

Figure 6:
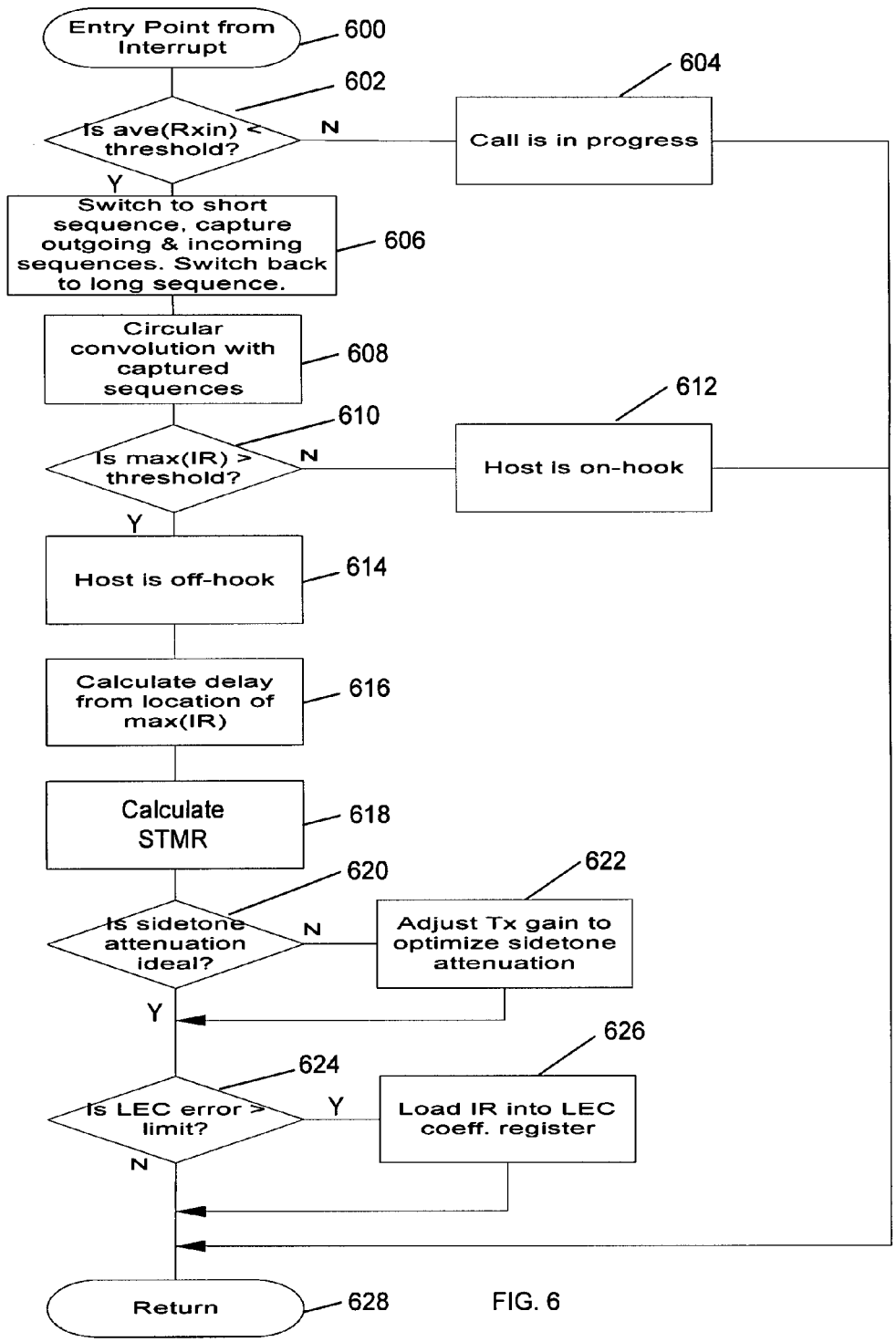
FIG. 6 is a flowchart illustrating monitoring of the state of a host phone hookswitch in which a test MLS signal utilizes alternating long MLS sequences and short MLS sequences.

Referring to FIG. 6, a flowchart illustrating monitoring of the state of a host phone hookswitch in which a short MLS sequence is inserted into a repeating long MLS sequence stream when a measurement is required. In one example, a long MLS sequence is sufficiently long to sound "white", i.e. it is long enough that when repeated indefinitely, there are no tonal properties perceived. In one example, application, this would be at least n=13 in the equation set forth above. A short sequence is one where n is less than 13 but also is short enough that the circular convolution can be processed fast enough with sufficient low frequency resolution. This value may vary and depends on the processor used and the application but n=6 or 7 is appropriate for this example implementation. At block 600, a system interrupt is generated. At decision block 602, the detection logic and system configuration controller 22 determines whether the receive signal (Rxin) level is below a predetermined threshold. If no at block 602, then this signifies a call is in progress at block 604 and the process skips to return block 628. If yes at block 602, then at block 606, the MLS generator switches to a short MLS sequence output and the outgoing and incoming sequences are captured. The MLS generator then switches back to a long MLS sequence output.

Figure 7:
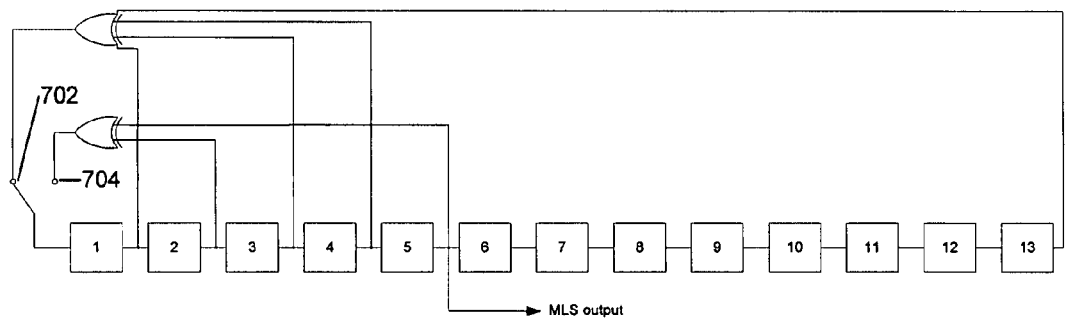
FIG. 7 illustrates a shift register used to generate both long and short MLS sequences with the signal output being taken from the end of the short sequence register

The process is similar to the process shown in FIG. 5 except for turning off the high order sequence MLS signal and inserting the short sequence measurement MLS signal. In practice, a shift register 700 can be used for both long and short sequences with the signal output being taken from the end of the short sequence register and the switching performed by selecting the appropriate taps 702, 704 as illustrated in FIG. 7. The MLS sequence output from the shift register will be different each time depending on the state of the register when the short length is selected. Consequently, the particular sequence generated each time must be captured for the circular convolution process to yield a true impulse response.

At block 608, the captured receive signal sample is circularly convolved with the original MLS signal test sequence. The result of this convolution is the impulse response of the host phone sidetone path. At decision block 610, the detection logic and system configuration controller 22 determines if the maximum impulse response is above a predetermined threshold level. If no at block 610, then at block 612 it is determined that the host phone is on-hook and the process skips to return block 628. If yes at block 610, then at block 614 it is determined that the host is off-hook. At block 616, the sidetone path delay is calculated from the location of the maximum impulse response.

At block 618, the STMR is calculated by the detection logic and system configuration controller 22. At decision block 620, the detection logic and system configuration controller 22 determines whether the calculated STMR is within a predetermined specification. If yes at decision block 620, then at decision block 624 it is determined whether the LEC error is greater than a predetermined limit. If no at decision block 620, then at block 622 the gain of transmit amplifier is adjusted to optimize sidetone attenuation prior to decision block 624. If no at block 624, then at return block 628 the process returns to the main program. If yes at decision block 624, then at block 626, the impulse response is loaded into the LEC coefficient register. At block 628, the process returns to the main program.

In a further example implementation, a sub-sequence of a long MLS sequence is utilized. In one example, a sub-sequence length is selected to yield sufficient low frequency resolution in characterizing the sidetone path while minimizing the processing time required to execute the circular convolution. For example, a sub-sequence length in the range 32 to 128 samples at a sample rate of 8 KS/s may be used. A long MLS sequence is used to ensure a white character to the noise while still achieving fast analysis by using a short portion of the total MLS sequence. The MLS generator is configured to output a high order MLS sequence continuously. At the moment in time that a sidetone path measurement is required, the analysis algorithm starts collecting samples from the MLS shift register output and the receive channel input stream. These two records form the input to the circular convolution. The circular convolution process will yield a true measure of the host phone hookswitch state and the sidetone path delay but because the sequence is not complete, the frequency response estimation will be slightly in error. It can be used as an estimate of the sidetone path transfer function but without averaging over time, the spectrum will be incomplete because there will not be equal energy at every frequency as guaranteed by the complete MLS sequence. Therefore, this implementation is inappropriate for initialization purposes as it cannot quickly provide an accurate measure of STMR.

Figure 8:
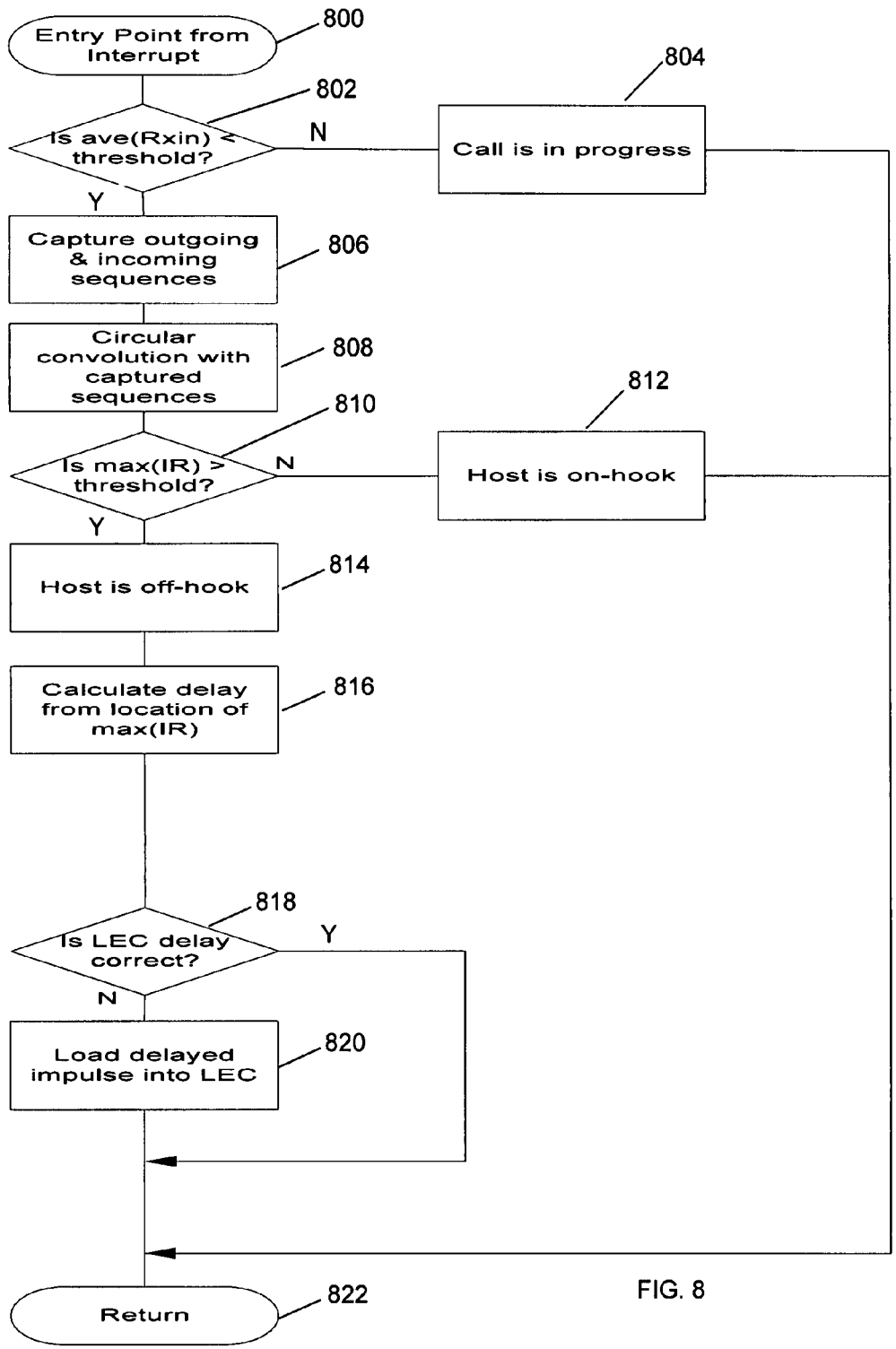
FIG. 8 illustrates a flowchart illustrating monitoring of the state of a host phone hookswitch in which a subsequence of a long MLS sequence is used.

Referring to FIG. 8, a flowchart illustrating monitoring of the state of a host phone hookswitch in which a subsequence of a long MLS sequence is used. This illustration assumes that some time previously, the MLS generator has been configured to continuously output a high order MLS sequence. At block 800, a system interrupt is generated. At decision block 802, the detection logic and system configuration controller 22 determines whether the receive signal (Rxin) level is below a predetermined threshold. If no at block 802, then this signifies a call is in progress at block 804 and the process skips to return block 822. If yes at block 802, then at block 806, the analysis algorithm starts collecting samples from the MLS shift register output and the receive channel input stream.

At block 808, the samples from the MLS shift register output and the receive channel input stream are circularly convolved. The result of this convolution is the impulse response of the host phone sidetone path. At decision block 810, the detection logic and system configuration controller 22 determines if the maximum of the impulse response is above a predetermined threshold level. If no at block 810, then at block 812 it is determined that the host phone is on-hook and the process skips to return block 822. If yes at block 810, then at block 814 it is determined that the host is off-hook. At block 816, the sidetone path delay is calculated from the location of the maximum of the impulse response.

At block 818, it is determined whether the LEC error is within a predetermined specification. If no at decision block 818, then at block 820 the delayed impulse is loaded into the LEC. If yes at decision block 818, the process skips to return block 822.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A headset adapter circuit comprising:
    a controller;
    an adjustable gain receive signal amplifier on an adapter receive signal line;
    an adjustable gain transmit signal amplifier on an adapter transmit signal line;
    a configurable switch matrix connected to the adapter receive signal line, the adapter transmit signal line, a host phone transmit signal line and a host phone receive signal line;
    a maximal length sequence generator coupled to the adapter transmit signal line for injecting a maximal length sequence signal into the adapter transmit signal line; and
    a maximal length sequence cross-correlator coupled to the adapter receive signal line for capturing a receive signal sample from the adapter receive signal line and convolving the receive signal sample with the maximal length sequence signal to generate a host phone sidetone path impulse response, wherein an adjustable gain transmit signal amplifier gain and a configurable switch matrix switch setting are modifiable responsive to the host phone sidetone path impulse response.

2. The headset adapter circuit of claim 1, further comprising a line echo canceller.

3. The headset adapter circuit of claim 2, wherein the host phone sidetone path impulse response is used as a starting set of coefficients for the line echo canceller.

4. The headset adapter circuit of claim 1, wherein convolving the receive signal sample with the maximal length sequence signal injected into the transmit signal line comprises using a Hadamard transform.

5. The headset adapter circuit of claim 1, wherein the maximal length sequence signal is injected at a network noise floor level.

6. The headset adapter circuit of claim 1, wherein an adjustable gain receive signal amplifier gain is modifiable responsive to the host phone sidetone path impulse response.

7. The headset adapter circuit of claim 1, wherein the maximal length sequence generator comprises a shift register with feedback.

8. The headset adapter circuit of claim 1, wherein the adjustable gain transmit signal amplifier gain is modifiable responsive to the host phone sidetone path impulse response to achieve a desired SideTone Masking Ratio.

9. The headset adapter circuit of claim 8, wherein the desired SideTone Masking Ratio comprises a range between 10 and 14.

10. The headset adapter circuit of claim 1, wherein a sidetone path delay is calculated by locating a peak in the host phone sidetone path impulse response.

11. The headset adapter circuit of claim 1, wherein the host phone sidetone path impulse response is utilized to determine whether a host phone is on hook or off hook.

12. The headset adapter circuit of claim 1, wherein the maximal length sequence signal comprises a short MLS sequence inserted into a repeating long MLS sequence.

13. The headset adapter circuit of claim 1, wherein the maximal length sequence signal comprises a sub-sequence of a long sequence.

14. A method for configuring a headset adapter comprising:
    injecting a test maximal length sequence signal into an adapter transmit signal line;
    taking a receive signal sample from an adapter receive signal line;
    convolving the test maximal length sequence signal with the receive signal sample to generate a host phone sidetone path impulse response;
    cycling through a plurality of configuration settings on a switch matrix until a host phone sidetone path impulse response maximum is above a pre-determined threshold level, wherein the switch matrix is connected to the adapter receive signal line, the adapter transmit signal line, a host phone transmit signal line and a host phone receive signal line;
    calculating a sidetone masking ratio; and
    adjusting a transmit amplifier gain to achieve a desired sidetone mask ratio.

15. The method of claim 14, further comprising monitoring a host phone hookswitch state using the host phone sidetone path impulse response.

16. The method of claim 14, further comprising loading the host phone sidetone path impulse response into a line echo canceller.

17. The method of claim 14, wherein the test maximal length sequence signal comprises a short MLS sequence inserted into a repeating long MLS sequence.

18. A headset adapter circuit comprising:
    a controller;
    an adapter receive signal line for coupling to a host phone;

an adapter transmit signal line for coupling to the host phone;

a maximal length sequence generator coupled to the adapter transmit signal line for injecting a maximal length sequence signal into the adapter transmit signal line; and a maximal length sequence cross-correlator coupled to the adapter receive signal line for capturing a receive signal sample from the adapter receive signal line and convolving the receive signal sample with the maximal length sequence signal to generate a host phone sidetone path impulse response used to measure one or more electro-acoustic properties of the host device.

19. The headset adapter circuit of claim 18, wherein the one or more electro-acoustic properties of the host phone comprise an impedance measurement, linearity measurement, or sidetone gain measurement.

20. The headset adapter circuit of claim 18, wherein the one or more electro-acoustic properties of the host phone comprise a host phone on hook or offhook determination.

21. The headset adapter circuit of claim 18, wherein convolving the receive signal sample with the maximal length sequence signal injected into the transmit signal line comprises using a Hadamard transform.

22. A method for measuring an electro-acoustic property of a host phone with a headset adapter comprising:

injecting a test maximal length sequence signal into a headset adapter transmit signal line;

taking a receive signal sample from a headset adapter receive signal line; and convolving the test maximal length sequence signal with the receive signal sample to generate a host phone sidetone path impulse response.

23. The method of claim 22, further comprising monitoring a host phone hookswitch state using the host phone sidetone path impulse response.

24. The method of claim 22, further comprising loading the host phone sidetone path impulse response into a line echo canceller.

* * * * *